(12) United States Patent
Lewis

(10) Patent No.: US 6,519,063 B1
(45) Date of Patent: Feb. 11, 2003

(54) PLANAR WAVE LENGTH MULTIPLEXER/DEMULTIPLEXER

(75) Inventor: Warren Hale Lewis, Newport, PA (US)

(73) Assignee: The Whitaker Corporation, Wilmington, DE (US)

(*) Notice: Subject to any disclaimer, the term of this patent is extended or adjusted under 35 U.S.C. 154(b) by 0 days.

(21) Appl. No.: 08/960,532

(22) Filed: Oct. 31, 1997

(51) Int. Cl.[7] .............. H04J 14/02; G02B 6/32; G02B 6/34
(52) U.S. Cl. .............. 359/130; 359/124; 359/127; 385/33; 385/37
(58) Field of Search .............. 385/33, 34, 37, 385/24; 359/634, 131; 350/96.16; 370/3

(56) References Cited

U.S. PATENT DOCUMENTS

| | | | | |
|---|---|---|---|---|
| 4,111,524 A | * | 9/1978 | Tomlinson, III | 350/96.19 |
| 4,274,706 A | * | 6/1981 | Tangonan | 350/96.19 |
| 4,420,219 A | * | 12/1983 | Muchel | 350/96.18 |
| 4,622,662 A | * | 11/1986 | Laude et al. | 370/3 |
| 4,634,215 A | * | 1/1987 | Reule | 350/96.16 |
| 4,652,080 A | * | 3/1987 | Carter et al. | 350/96.19 |
| 4,715,027 A | * | 12/1987 | Mahapatra et al. | 370/3 |
| 4,773,063 A | * | 9/1988 | Hunsperger et al. | 370/3 |
| 4,993,796 A | * | 2/1991 | Kapany et al. | 350/96.15 |
| 5,026,131 A | * | 6/1991 | Jannson et al. | 350/3.7 |
| 5,074,629 A | * | 12/1991 | Zdeblick | 385/14 |
| 5,243,672 A | | 9/1993 | Dragone | 385/46 |
| 5,359,684 A | * | 10/1994 | Hosokawa et al. | 385/33 |
| 5,412,744 A | | 5/1995 | Dragone | 385/24 |
| 5,500,910 A | | 3/1996 | Boudreau et al. | 385/24 |
| 5,513,289 A | | 4/1996 | Hosokawa et al. | 385/33 |
| 5,517,589 A | | 5/1996 | Takeuchi | 385/24 |
| 5,581,639 A | | 12/1996 | Davies et al. | 385/10 |
| 5,768,450 A | * | 6/1998 | Bhagavatula | 385/24 |
| 5,818,986 A | * | 10/1998 | Asawa et al. | 385/24 |
| 6,025,939 A | * | 2/2000 | Lowenhar et al. | 359/34 |

OTHER PUBLICATIONS

Optoelectronic Integration: Physics, Technology and Applications–Copyright 1994 by Kluwer Academic Publishers–pp. 180, 181, 182.

* cited by examiner

Primary Examiner—Jason Chan
Assistant Examiner—M. R. Sedighian
(74) Attorney, Agent, or Firm—Synnestvedt & Lechner LLP

(57) ABSTRACT

The present invention relates to a planar wave guide structure having a grating element fabricated thereon as well as a focusing element therein. The lens element of the present disclosure is preferably a void, to include air, a vacuum or other material which has an index of refraction less than an index of refraction of the core layer of the planar wave guide in which the lens element is disposed. The lens element is preferably fabricated by laser micromachining or other techniques described herein. The grating at the far end of the planar wave guide functions to separate wavelengths in the demultiplexing embodiment of the present disclosure, and as a wavelength integrator in the multiplexing embodiment of the disclosure of the present invention.

21 Claims, 2 Drawing Sheets

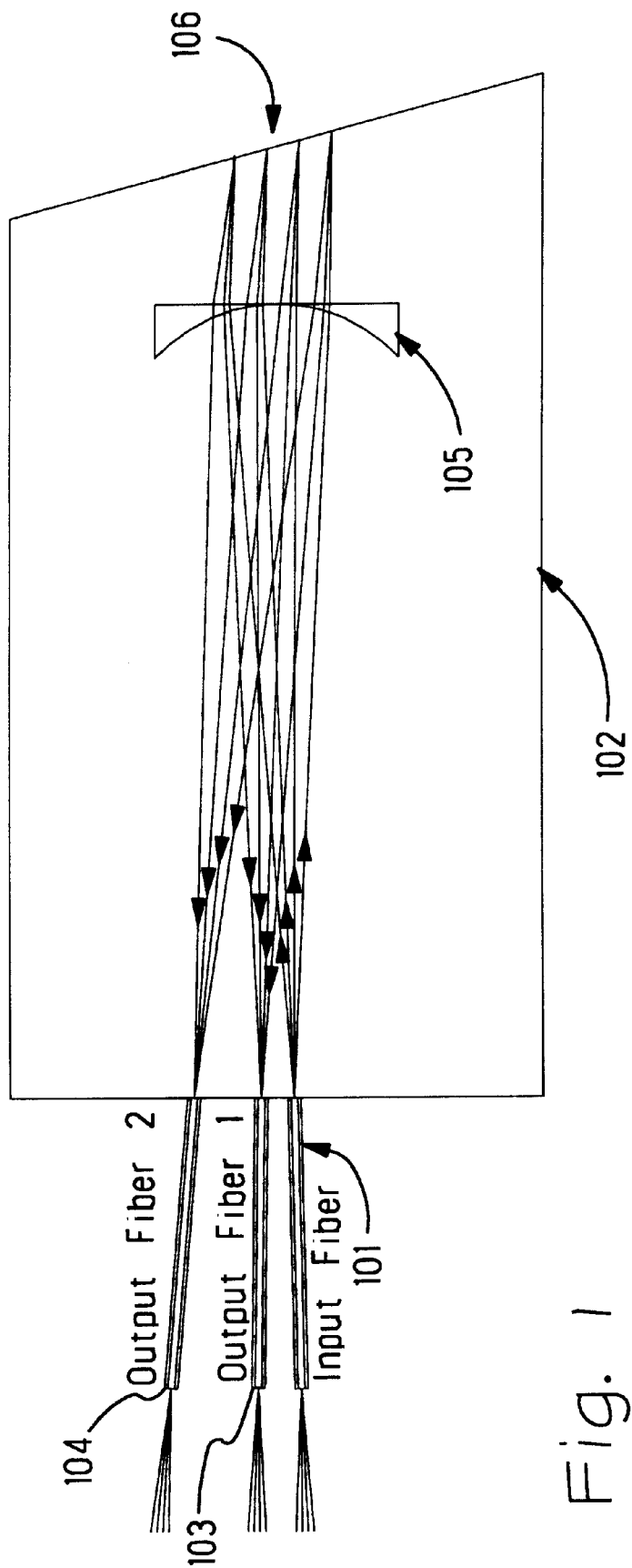
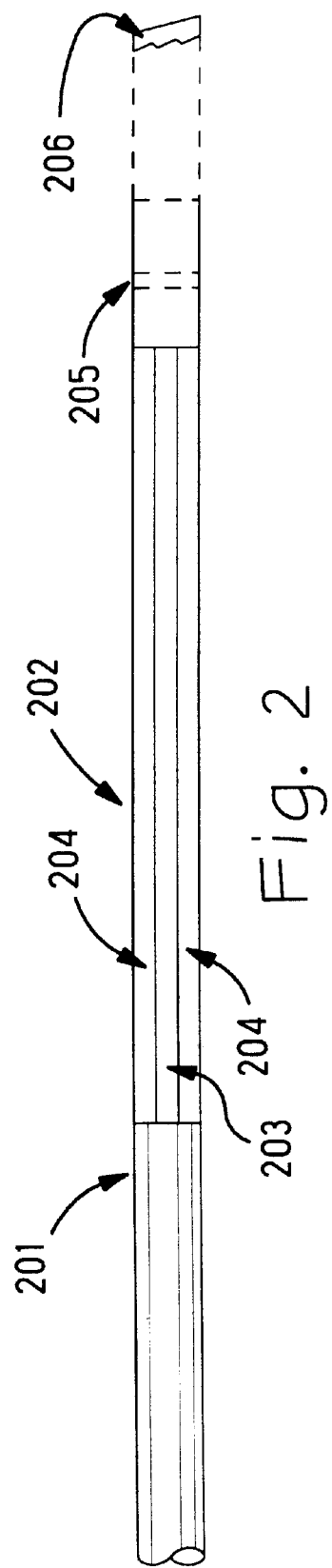
Fig. 1
Fig. 2

PLANAR WAVE LENGTH MULTIPLEXER/ DEMULTIPLEXER

FIELD OF THE INVENTION

The present invention relates to a planar waveguide having an integral focusing element and suitable grating to effect multiplexing/demultiplexing of optical signals.

BACKGROUND OF THE INVENTION

Wave length division multiplexing (WDM) is a technique used to spread information carrying signals over a large number of optical frequency channels. This technique can be used to increase transmission capacity over a given optical length, or to direct different channels to different destinations. The use of WDM systems can also be deployed to increase the transmission capacity of optical lengths operating over large distances. In a typical fiber optic link, in an input fiber carrying wave lengths $\lambda_1, \ldots \lambda_n$, such a multiplexed system is demultiplexed with the signals at the various wave lengths routed to different destinations. This is carried out with a demultiplexer. In the opposite case, a number of optical fibers having individual wavelengths $\lambda_1, \ldots \lambda_n$, where fiber one carries wavelength $\lambda_1$ fiber two carries wavelength $\lambda_2$, and so forth. A multiplexing element such as a grating will properly direct the individual wavelengths into one output fiber. The device utilized in effecting the multiplexing can consist of an optical element and a diffraction grating. Diffraction gratings are, in their simplest form, arrays of diffractive elements, either apertures or obstacles which have the effect of producing periodic alterations in the phase, amplitude, or both of an emergent wave. A common grating for effecting specular reflection is a blazed grating. Such a grating is one in which ruling grooves having a controlled shape are used to effect a particular interference pattern. Blazed planar gratings with nearly rectangular grooves are often mounted so that the incident propagation vector is substantially normal to either one of the groove faces. Put another way, the incident propagation vector is parallel to the normal to one of the groove faces and the collimation of incident radiation to achieve normal incidence to the grating is done by a collimating lens. This condition is known as autocollimation, and the angular dispersion of such a grating is inversely proportional to the wavelengths of light. Relatively straight forward analysis of the conditions of autocollimation can yield the chromatic resolving power of such a spectrometer set forth by the Littrow grating described above. In most applications, bulk optics is employed to effect such a grating system to effect multiplexing/demultiplexing of an optical signal.

As stated above, optical fibers are a primary vehicle to effect optical communications. However, integrated optical circuits are particularly convenient and efficient to effect various functions to include switching and, in the context of the present disclosure, multiplexing and demultiplexing. To this end, integrated systems which have optical elements and necessary devices such as gratings can be carried out in planar waveguides. To this end, U.S. Pat. No. 5,412,744 to Dragone and U.S. Pat. No. 5,243,672 also to Dragone, the disclosures of which are specifically incorporated herein by reference, disclose planar waveguides used to effect multiplexing and demultiplexing. As can be appreciated from a review of these patents, the system utilized to effect the wavelength selectivity is relatively complex and therefore difficult to manufacture. In addition, U.S. Pat. No. 5,500,910 to Boudreau, et al. discloses an integrated optic multiplexing/demultiplexing device for use with optical wave guides. While the system to Boudreau, et al. is less complicated than many integrated optic multiplexers and demultiplexers, it is still relatively complex and thereby difficult and expensive to manufacture.

Accordingly, what is needed, is an integrated optic multiplexing scheme which incorporates simplicity and thereby reduced cost of manufacture as well as readily available techniques to effect manufacture.

SUMMARY OF THE INVENTION

The present invention relates to a planar waveguide structure having a grating element fabricated thereon as well as a focusing element. In the preferred embodiment of the present invention, a Littrow or other blazed grating is disposed at one end of the planar waveguide and a collimating lens element is disposed in the waveguide to collimate the light so that an autocollimation grating as described above is effected in an integrated form. The lens element of the present disclosure is fabricated by laser ablating through the cladding and core layers so that an air lens is constructed in the planar grating. To this end, the collimator of the planar waveguide is preferably laser micromachined and an air lens is disposed therein in a selected area. Because the index of refraction of air is less than that of the polymer core wave guide, a geometric shape opposite that of what is conventional in optical systems is effected. To this end, a lens takes light from a point source and collimates it. On the other hand the same lens will act as a converging lens for collimated light. In the present example, because the indices of refraction are reversed, a concave lens in air is used. This follows from standard paraxial theory of geometric optics, well known to one of ordinary skill in the art.

In an exemplary embodiment of the present disclosure, an input optical fiber having a multiplexed signal wavelengths $\lambda_1$ and $\lambda_2$ is coupled to the planar wave guide of the present disclosure. This light impinges thereafter on the air lens and thereby collimated. The collimated light from the input fiber is impingent on the blazed grating disposed on the opposite surface of the planar waveguide, and is spatially separated by wave length according to well-known diffraction theory as discussed above. The light is then reflected from the grating and appropriately focused by the lens element which now acts as a converging element to selectively dispose the spacially separated wave length of light to output fibers at the same end of the wave guide as is the input fiber.

OBJECTS, FEATURES AND ADVANTAGES

It is an object of the present invention to have an integrated optical multiplexer/demultiplexer in a planar waveguide structure.

It is a feature of the present invention to have a lens element in the waveguide structure, with the lens being a void or other medium having an index of refraction less than that of the core layer of the waveguide in the waveguide layers.

It is a further feature of the present invention to have a diffraction grating for wavelength coupling/separation fabricated on the planar waveguide.

It is an advantage of the present invention to have a readily manufactured, simple structure to effect multiplexing and demultiplexing in an optical waveguide system.

BRIEF DESCRIPTION OF THE DRAWINGS

FIG. 1 is a top view of the integrated WDM of the present disclosure with input optical fibers and output optical fibers selectively disposed.

FIG. 2 is a side view of the WDM of FIG. 1.

DETAILED DESCRIPTION OF THE INVENTION

Turning to FIG. 1, the input optical fiber 101 interfaces with the wave 102 as is shown. The structure as is shown in FIG. 1 is an exemplary structure in which there are two input wavelength signals $\lambda_1$ and $\lambda_2$ from the input fiber 101 with the signals $\lambda_1$ and $\lambda_2$ output to fibers 103 and 104, respectively.

Figure 3:
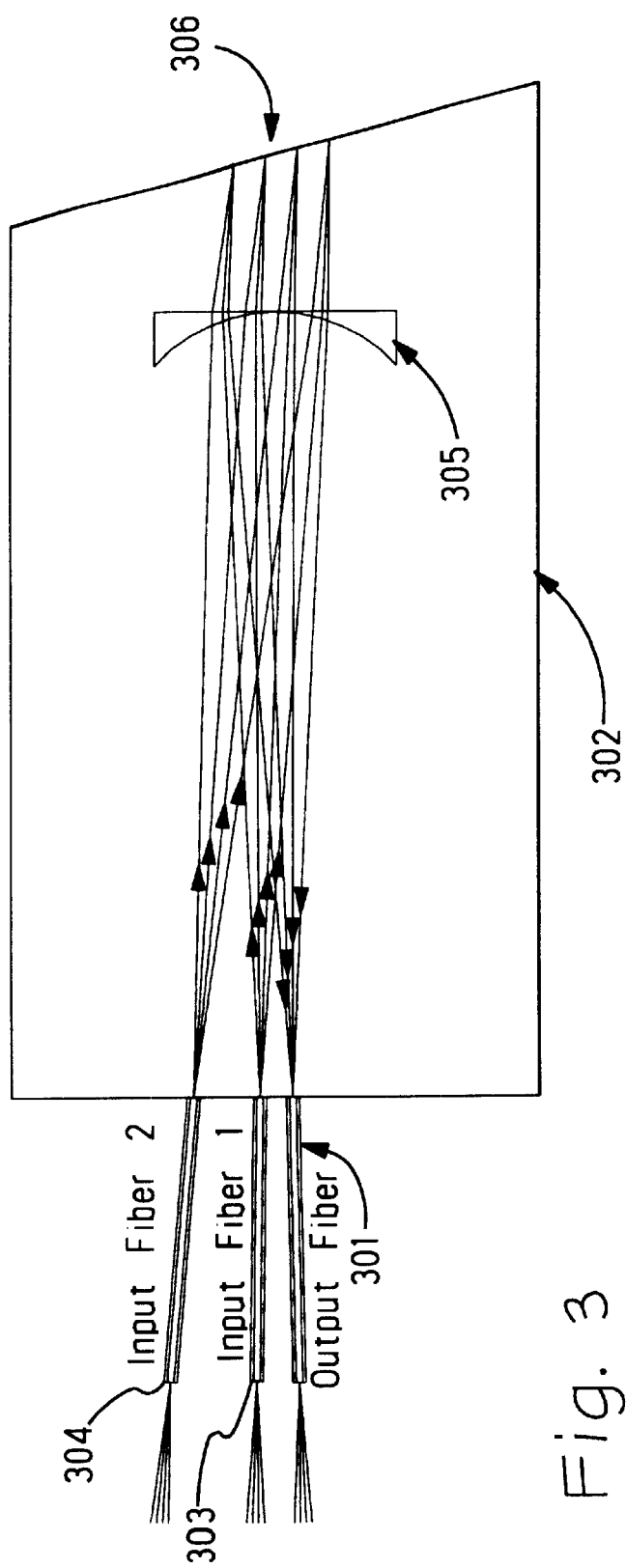
FIG. 3 is a top view of the integrated multiplexer of the present disclosure.
Figure 4:
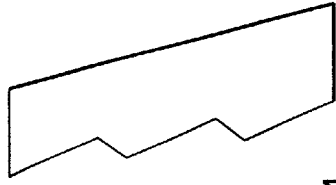
FIG. 4 is an exemplary section of a blazed diffraction grating.

Clearly the invention of the present disclosure can effect wavelength multiplexing and demultiplexing for at least two wavelengths, and the example shown in FIGS. 1 and 3 are used to simplify the illustration and disclosure of the present invention. To this end, while only two output fibers are shown in the demultiplexing scheme of FIG. 1, it is clearly within the purview of the artist of ordinary skill that wavelengths $\lambda_1 \ldots, \lambda_n$ can be effected by the diffraction grating and lens element as shown in FIG. 1. The same is true of the multiplexer of FIG. 3. That is 1 X n multiplexing/demultiplexing devices can be readily achieved from the teaching of the present invention. The spatial separation of wave lengths is limited only by the resulting power of the defraction grating. As light input from optical fiber 101 impinges upon the lens element 105, it is collimated. As explained above, it is necessary to achieve the condition of autocollimation discussed above with respect to blazed gratings. The grating is disposed on the far end 106 of the wave guide. Upon reflection from the diffraction grating on the surface 106, the light is separated by wave lengths according to basic principles of diffraction. This light is focused thereafter by the lens 105 onto respective output optical fibers 103 and 104, thus completing the demultiplexing of the input wavelengths $\lambda_1$ and $\lambda_2$. Turning to FIG. 2, the structure of the present disclosure of FIG. 1 is shown in side view. To this end, the input optical fibers are shown at 201 and the wave guide structure having a core layer 203 and cladding layers 204 is shown at 202. The lens element 205 is also shown with the grating shown at 206. The grating shown in FIGS. 2, 4 is exemplary and clearly other gratings could be used. The number of obstacles in the grating is also exemplary. To this end, the dimensions and frequency/separation of the obstacles can be varied for the required application. Diffraction is a physical phenomenon associated with departures from geometric optics caused by the finite wavelength of the waves, and thus involves apertures or, in this case, obstacles having dimensions which are large compared to the wavelength of the light. Accordingly, the number of obstacles, dimensions thus spacing of the obstacles can be varied and the grating shown is merely illustrative for ease of discussion of the present invention.

The materials of the present disclosure are preferably as follows. The wave guide structure is preferably a planar structure made of polymer or glass material with the core layer and cladding layer of differing indices of refraction as is required. The grating 206 is shown more clearly in FIG. 4 as a relatively flat Littrow mounted diffraction grating. This can be fabricated through standard technique, as follows. The fiber grading can be micromachined with a laser of preferably short wavelengths. Furthermore, the grading could be etched by standard dry etching techniques, although other etching techniques are within the purview of the invention of the present disclosure. The fabrication of the gradings can be effected by various and sundry techniques known to one of ordinary skill in the art. Additionally, the standard technique for fabricating a grating is a replication technique. To this end, a master grating has a metal layer and epoxy layer respectively disposed there on. This is adhered to the substrate and cured. This is then separated such that the master grating is then separated, and the result is a metal surface in the shape of the glazed grating. The result is stated above, this is a standard technique for fabricating gratings. The lens element shown in the exemplary view in FIGS. 1 and 2, is, as stated before, fabricated by creating a void in the layers of the waveguide structure. To this end, lasers micromachining, a technique well known to one of ordinary skill of the art, can be carried out to create the concave shape with aberrations within acceptable tolerance to enable the collimating and converging properties of the lens element 105. Alternatively, if a silica waveguide is employed, selective etching of the silica can be carried out either by wet or dry etching techniques. The lens can be honed by laser micromachining or etching techniques well known to one of ordinary skill in the art. While the preferred embodiment of the present invention envisions a void or an air lens, it is clear that air, a vacuum or any other material to include liquids or semi-solids can be used as the lens. The criteria that is of importance is that the index of refraction of the lens be less than the index of refraction of the core layer of the waveguide. An exemplary technique of fabricating the lens after micromachining is to resurface the lens. To this end, during micromachining, aberrations can result. These aberrations result in dispersion and a reduction in the efficiency of the lens. As these are undesired, one novel technique which can be employed is to resurface the lens. This is done with a mold. For example, a liquid polyguide material can be disposed in the void and cured. This is thereafter removed and the aberrations in the lens are optically "smooth" by the filling of the aberrations with the polyguide material. Finally, it is of interest to note that instead of air, a suitable gas can fill the lens area.

FIG. 3 shows an alternative to the device of the present disclosure wherein a multiplexing scheme is set forth. In FIG. 3, input fiber 303 and input fibers 304 are shown with output fiber shown at 301. In this example, multiplexing is carried out. That is an input from optical fiber 1 at wavelength $\lambda_1$ and input from optical fiber 2 $\lambda_2$ is impinged on the collimating lens and the diffraction grating, and is reflected therefrom. This light at wavelength $\lambda_1$ and $\lambda_2$ is coupled to the output fiber 301 to effect wavelengths division multiplexing.

As stated above, the present disclosure is drawn to a multiplexing/demultiplexing scheme in general. The exemplary discussion above is drawn primarily to a one by two structure, but it is clearly within the purview of one of ordinary skill in the art that many additional output fibers can be employed to accommodate many more wavelengths in the demultiplexing scheme and many additional input fibers can be employed to accommodate many additional wavelengths in the multiplexing scheme. In the deployment of the present invention, the invention can be used for both single mode and multi-mode applications in a demultiplexing scheme. Because single mode fiber has a core layer which is too small to efficiently couple to the planar waveguide, it would be difficult to utilize the invention of the present disclosure in a multiplexing scheme due to the differential in the waveguide size of the planar waveguide and a single mode fiber.

The preferred embodiment of the present disclosure outlines the use of optical fibers for input and output. In practice, optical fibers are not necessary to affect the invention of the present disclosure. To this end, it is clearly within the purview of the artisan of ordinary skill that planar waveguides can be used with input and output to the multiplexer/demultiplexer. The fabrication of the integrated multiplexing/demultiplexing device having planar input/output waveguides is clearly within the purview of the art as an ordinary skill.

In addition, it is important to note an alternative embodiment of the demultiplexer of the present invention. In the alternative demultiplexing scheme of the present invention, a detector array having a selected number of detectors is coupled to the planar waveguide structure and positioned in a manner similar to that which is shown in FIG. 1 for the output fibers. Input from a single mode or multi-mode fiber having multiple wavelengths there in is coupled to the waveguide as describe above. The demultiplexing process is carried out, again as describe above by the diffraction grating and lens element 105. This embodiment provides a relatively low cost demultiplexing scheme for both single mode and multi-mode applications.

The invention having been described in detail, it is clear that modifications and variations to the disclosure of the present invention are within the purview of the artist and of ordinary skill. To the extent that these modifications and variations of the planar wave guide WDM having the void in the waveguide layers to form an integral lens and a diffraction grating on the far end of the wave guide are within the purview of the artisan of ordinary skill, such modifications and variations are deemed within the scope of the invention described herein above.

I claim:

1. An integrated optical demultiplexing device comprising:
    a planar waveguide having a first end and a second end;
    at least one optical input waveguide coupled to said planar waveguide at said first end;
    at least two output waveguides coupled to said planar waveguide at said first end;
    a wavelength separating element disposed on said second end; and
    an optical coupling element disposed in said planar waveguide, said coupling element formed of a void in said planar waveguide, said void having an index of refraction different from an index of refraction of a core layer of said planar waveguide.

2. An integrated optical demultiplexing device as recited in claim 1 wherein said void is filled with air.

3. An integrated optical demultiplexing device as recited in claim 1 wherein said wavelength separating element is a diffraction grating.

4. An integrated optical demultiplexing device as recited in claim 1 wherein said diffraction grating is a blazed grating integrally formed on said second end.

5. An integrated optical demultiplexing device as recited in claim 1, wherein said planar waveguide is formed of a polymer material.

6. An integrated optical demultiplexing device as recited in claim 1 wherein said at least one input waveguide and said at least two output waveguides are optical fibers.

7. An integrated optical demultiplexing device as recited in claim 1 wherein said optical coupling element collimates light from said input waveguide before it reaches said wavelength separating element.

8. An integrated optical demultiplexing device as recited in claim 7 wherein said optical coupling element is positioned such that said light from said input waveguide passes through said optical coupling device a first time before said light impinges upon said wavelength separating element and a second time after impinging upon said wavelength separating element.

9. The integrated optical demultiplexing device as recited in claim 8 wherein said optical coupling element is a lens.

10. The integrated optical demultiplexing device as recited in claim 9 wherein said lens is a concave lens.

11. An integrated optical demultiplexing device as recited in claim 1 wherein said void is filled with a gas having an index of refraction different from an index of refraction of a core layer of said planar wave guide.

12. An integrated optical demultiplexing device comprising:
    an input waveguide, said input waveguide carrying at least two wavelengths of light;
    at least two output waveguides, each of said two output waveguides carrying one of said at least two wavelengths of light;
    a planar waveguide having a first end to which said output and input waveguides are coupled, and a second end on which is disposed a wavelength separation device; and
    a lens element disposed between said first and said second ends, said lens element comprising a void in said planar waveguide and having an index of refraction which is less than an index of refraction of a core layer of said waveguide.

13. A demultiplexing device as recited in claim 12, wherein said wavelength separating device is a diffraction grating.

14. A demultiplexing device as recited in claim 12, wherein said void in said planar waveguide is filled with air.

15. A demultiplexing device as recited in claim 12, wherein said input and output waveguides are planar waveguides.

16. A demultiplexing device as recited in claim 12, wherein said input and said output waveguides are optical fibers.

17. An integrated optical demultiplexing device as recited in claim 12 wherein said lens is positioned such that said light from said input waveguide passes through said optical coupling device a first time before said light impinges upon said wavelength separating element and a second time after impinging upon said wavelength separating element.

18. A multiplexing device, comprising:
    at least two input waveguides, each of said input waveguides carrying distinct wavelengths of light;
    an output waveguide, said output waveguide carrying both of said distinct wavelengths off light;
    a planar waveguide having a first end to which said output and input waveguides are coupled, and a second end on which is disposed a diffraction grating;
    a lens element disposed between said first and said second ends, said lens element comprising a void in said planar waveguide and having an index of refraction which is less than an index of refraction of a core layer of said waveguide.

19. A multiplexing device as recited in claim 18, wherein said input and output waveguides are planar waveguides.

20. A multiplexing device as recited in claim 18 wherein said input and said output waveguides are optical fibers.

21. An integrated optical multiplexing device as recited in claim 10 wherein said lens is positioned such that said light from said input waveguides passes through said optical coupling device a first time before said light impinges upon said wavelength separating element and a second time after impinging upon said wavelength separating element.

* * * * *